US011704364B2

(12) United States Patent
Gupta et al.

(10) Patent No.: US 11,704,364 B2
(45) Date of Patent: Jul. 18, 2023

(54) EVALUATION OF SECURITY POLICIES IN REAL-TIME FOR ENTITIES USING GRAPH AS DATASTORE

(71) Applicant: Citrix Systems, Inc., Ft. Lauderdale, FL (US)

(72) Inventors: R V Shouri Gupta, Bangalore (IN); Subramanian Ramamurti, Bangalore (IN); Jayaraj Muthukumarasamy, San Jose, CA (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 333 days.

(21) Appl. No.: 17/007,199

(22) Filed: Aug. 31, 2020

(65) Prior Publication Data

US 2022/0067097 A1 Mar. 3, 2022

(51) Int. Cl.
*G06F 16/901* (2019.01)
*G06F 21/57* (2013.01)
*G06F 21/62* (2013.01)

(52) U.S. Cl.
CPC ........ *G06F 16/9024* (2019.01); *G06F 21/577* (2013.01); *G06F 21/6218* (2013.01)

(58) Field of Classification Search
CPC ............... G06F 16/9024; G06F 21/577; G06F 21/6218
USPC ........................................................ 707/798
See application file for complete search history.

(56) References Cited

U.S. PATENT DOCUMENTS

2018/0144138 A1\* 5/2018 Zhang .................. G06F 21/577
2019/0394225 A1\* 12/2019 Vajipayajula ....... G06F 16/9024

\* cited by examiner

*Primary Examiner* — Joshua Bullock

(57) ABSTRACT

A method for policy-based analytics includes retrieving, from a graph database, first data representing a first entity in a computing environment, a second entity in the computing environment, and an event associated with the first entity and the second entity; predicting, according to a risk indicator model, a risk associated with the first entity based at least in part on the event; and updating the graph database to include second data representing the risk and a risk indicator. The first and second entities are stored as properties of a first vertex and a second vertex, respectively, and the event is stored as a property of an edge between the first vertex and the second vertex. The risk indicator is stored as a property of a third vertex. The risk is stored as a property of an edge between the first vertex and the third vertex.

20 Claims, 6 Drawing Sheets

EVALUATION OF SECURITY POLICIES IN REAL-TIME FOR ENTITIES USING GRAPH AS DATASTORE

BACKGROUND

In certain computing environments, analytical tools can be employed to provide users and administrators with insightful information for making decisions and improvements relating to the operation of those environments. For example, the analytical tools can be configured to determine the risk posed to data security by continuously or periodically evaluating the activities of a given entity in the environment. One or more security policies can be established to define actions that can be taken in response to the risk, for instance, actions to mitigate the risk by disabling or preventing further activity. However, there are challenges associated with rapidly storing and accessing the large volumes of data for use by these analytical tools in real time or in near-real time as needed to effectively respond to such risks.

SUMMARY

In at least one example, a method for analyzing the activities of one or more entities operating in a computing environment includes retrieving, from a graph database, first data representing a first entity in a computing environment, a second entity in the computing environment, and an event associated with the first entity and the second entity. The first entity and the second entity are stored in the graph database as properties of a first vertex and a second vertex, respectively. The event is stored in the graph database as a property of an edge between the first vertex and the second vertex. The method further includes predicting, according to a risk indicator model, a risk associated with the first entity based at least in part on the event, and updating the graph database to include second data representing the risk and a risk indicator, where the risk indicator is stored in the graph database as a property of a third vertex, and where the risk is stored in the graph database as a property of an edge between the first vertex and the third vertex.

Implementations of the method can include one or more of the following.

In some examples, the method includes generating an alert based at least in part on the risk; retrieving, from the graph database, information associated with the alert; evaluating the information against at least one policy associated with the first entity to determine whether the information satisfies at least one condition in the at least one policy; and causing, in response to determining that the information satisfies the at least one condition, an action to occur with respect to the first entity.

In some examples, the method includes assigning, according to an entity risk scoring model, a risk score to the first entity based at least in part on the event and the risk, where the at least one condition is based at least in part on the risk score.

In some examples, the method includes updating the graph database to include third data representing the risk score, where the risk score is stored in the graph database as an additional property of the edge between the first vertex and the third vertex.

In some examples, the method includes preprocessing at least one of the first data and/or the second data to produce enriched data, where the risk is predicted based at least in part on the enriched data; and updating the graph database to include the enriched data, where the enriched data is stored in the graph database as one or more additional properties of the first vertex and/or the edge between the first vertex and the third vertex.

In some examples, the method includes receiving an additional event associated with the first entity and the second entity; predicting, according to the risk indicator model, an additional risk associated with the first entity based at least in part on the additional event; and updating the graph database to include third data representing the additional risk, where the additional risk is stored in the graph database as an additional property of the edge between the first vertex and the third vertex.

In some examples, the method includes generating an additional alert based at least in part on the additional risk; retrieving, from the graph database, information associated with the additional alert; evaluating the information against at least one policy associated with the first entity to determine whether the information satisfies at least one condition in the at least one policy; and causing, in response to determining that the information satisfies the at least one condition, an additional action to occur with respect to the first entity.

In another example, a non-transitory machine-readable medium has processor executable instructions encoded thereon that when executed by at least one processor cause a process to be carried out. The process includes retrieving, from a graph database, first data representing a first entity in a computing environment, a second entity in the computing environment, and an event associated with the first entity and the second entity. The first entity and the second entity are stored in the graph database as properties of a first vertex and a second vertex, respectively. The event is stored in the graph database as a property of an edge between the first vertex and the second vertex. The process further includes assigning, according to an entity risk scoring model, a risk score to the first entity based at least in part on the event; and updating the graph database to include second data representing the risk score and a risk indicator, where the risk indicator is stored in the graph database as a property of a third vertex, and where the risk score is stored in the graph database as a property of an edge between the first vertex and the third vertex.

Implementations of the non-transitory machine-readable medium can include one or more of the following.

In some examples, the process includes generating an alert based at least in part on the risk score; retrieving, from the graph database, information associated with the alert; evaluating the information against at least one policy associated with the first entity to determine whether the information satisfies at least one condition in the at least one policy; and causing, in response to determining that the information satisfies the at least one condition, an action to occur with respect to the first entity.

In some examples, the process includes predicting, according to a risk indicator model, a risk associated with the first entity based at least in part on the event, where the at least one condition is based at least in part on the risk.

In some examples, the process includes updating the graph database to include third data representing the risk, where the risk is stored in the graph database as an additional property of the edge between the first vertex and the third vertex.

In some examples, the process includes preprocessing at least one of the first data and/or the second data to produce enriched data, where the risk score is assigned based at least in part on the enriched data; and updating the graph database to include the enriched data, where the enriched data is stored in the graph database as one or more additional properties of the first vertex and/or the edge between the first vertex and the third vertex.

In some examples, the process includes receiving an additional event associated with the first entity and the second entity; updating, according to the entity risk scoring model, the risk score based at least in part on the additional event; and updating the graph database to include third data representing the updated risk score.

In some examples, the process includes generating an additional alert based at least in part on the updated risk score; retrieving, from the graph database, information associated with the additional alert; evaluating the information against at least one policy associated with the first entity to determine whether the information satisfies at least one condition in the at least one policy; and causing, in response to determining that the information satisfies the at least one condition, an additional action to occur with respect to the first entity.

In yet another example, a system includes a storage and at least one processor operatively coupled to the storage. The at least one processor is configured to execute instructions stored in the storage that when executed cause the at least one processor to carry out a process. The process includes retrieving, from a graph database, first data representing a first entity in a computing environment, a second entity in the computing environment, and an event associated with the first entity and the second entity; predicting, according to a risk indicator model, a risk associated with the first entity based at least in part on the event; and updating the graph database to include second data representing the risk and a risk indicator.

Implementations of the system can include one or more of the following.

In some examples, the process includes generating an alert based at least in part on the risk; retrieving, from the graph database, information associated with the additional alert; evaluating the information against at least one policy associated with the first entity to determine whether the information satisfies at least one condition in the at least one policy; and causing, in response to determining that the information satisfies the at least one condition, an action to occur with respect to the first entity.

In some examples, the process includes assigning, according to an entity risk scoring model, a risk score to the first entity based at least in part on the event and the risk, where the at least one condition is based at least in part on the risk score.

In some examples, the process includes updating the graph database to include third data representing the risk score.

In some examples, the process includes receiving an additional event associated with the first entity and the second entity; predicting, according to the risk indicator model, an additional risk associated with the first entity based at least in part on the additional event; and updating the graph database to include third data representing the additional risk.

In some examples, the process includes generating an additional alert based at least in part on the additional risk; retrieving, from the graph database, information associated with the additional alert; evaluating the information against at least one policy associated with the first entity to determine whether the information satisfies at least one condition in the at least one policy; and causing, in response to determining that the information satisfies the at least one condition, an additional action to occur with respect to the first entity.

Other aspects, examples, and advantages of these aspects and examples, are discussed in detail below. It will be understood that the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
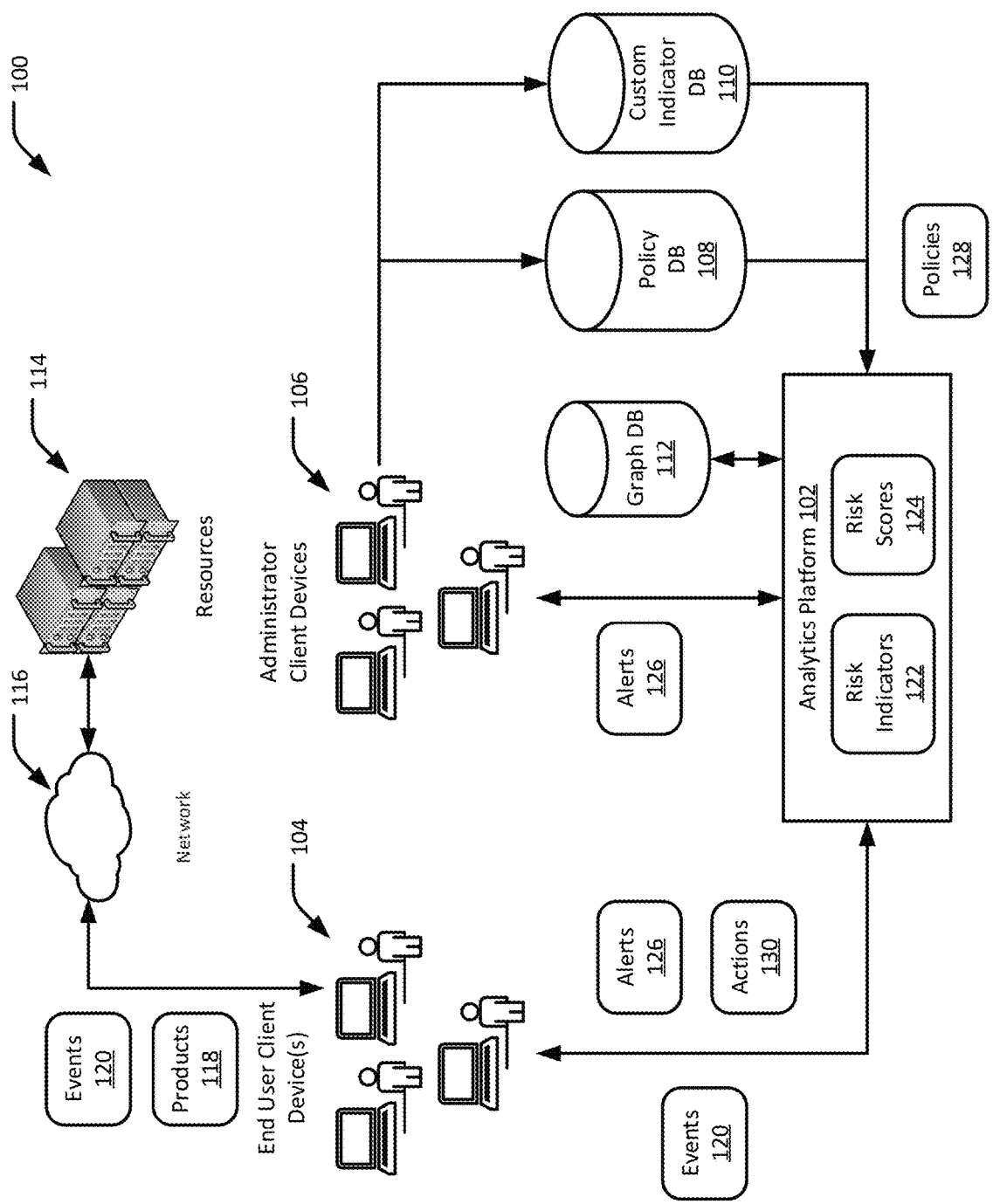
FIG. 1 is a block diagram of an example policy-based analytics system, in accordance with an example of the present disclosure.

As summarized above, at least some examples described in this disclosure are directed to techniques for rapidly analyzing the activities of one or more entities operating in a computing environment, determining whether any risks are present, and potentially causing one or more actions to occur in response to the risks. Such risks can include threats to data security or other resources within the environment, such as data breach or loss, abuse of computing resources, malicious interference with computing resources, unauthorized access to data or computing resources, authentication or malware attacks, loss of encryption keys, and/or compliance risks. The disclosed techniques can be implemented in any type of computing environment, such as business process services, application infrastructure services, cloud application services, application and data management and security services, or cloud system infrastructure services. These techniques proactively and effectively detect data security risks associated with the activities undertaken by an entity in the computing environment by utilizing graph databases, which are configured to provide high-speed access to the data used for the analytics and which significantly outperform the speed of conventional relational (non-graph) databases. Specifically, the data generated by the entities when performing these activities is stored in a graph database or datastore. The data are continuously or periodically analyzed in real-time using, for example, machine-learning models, statistical models, and/or custom rules configured to detect and respond to these risks.

In more detail, at least some examples include systems and methods that i) predict risk associated with an entity and/or assign a risk score to the entity based at least in part on events associated with the entity, ii) update a graph database to include the risk and/or the risk score, and iii) generate one or more alerts and actions based at least in part on the risk and/or the risk score. The relationships between entities (such as users, devices, networks, etc.) and associated risks (indicators of threat or attack) are evaluated using a set of rich security policies.

The risks are raised as risk indicators against the entity. In some examples, the activities, or risk behaviors, of the entity are analyzed against the risk indicators and assigned a risk score. An alert is triggered by the risk indicator and/or by the risk score. The alert is an indicator that further analysis is to be performed on the activity, or, more specifically, on an event associated with the activity. The alert is triggered when the risk indicator is generated and/or the risk score changes value. One or more policies can be assigned to each entity. The policies are evaluated in real-time after the alert is generated and after one or more conditions of the policy are evaluated by querying the graph database. Evaluation of the policies is triggered by the alert or when other pre-configured conditions exist. Once triggered, the policy causes one or more actions to be taken by or for the entity, or otherwise recommended to the user. Such actions can be designed to mitigate or eliminate the risk, once the conditions defined by the policy are satisfied. Given the nature of the security policies, the disclosed techniques use a graph database (or datastore), which stores and receives dynamic updates to these entities and relationships. By using a graph database, the disclosed techniques provide the ability to evaluate the policies in real time rapidly, efficiently, and effectively. The disclosed techniques also utilize a set of services (such as an alert processor and a policy evaluator) that implement real-time processing of the risk indicators and the risk scores, evaluation of the security policies, and generation of actions, in a way that enables flexible policy definitions and cloud-scale implementation.

Policy-Based Analytics System

FIG. 1 is a block diagram of an example policy-based analytics system 100, in accordance with an example of the present disclosure. The system includes an analytics platform 102 that is in communication with one or more end user client devices 104, one or more administrator client devices 106, a policy database 108, a custom indicator database 110, and a graph database 112. FIG. 1 also shows lines of communication between these components and databases. Details regarding these communications are discussed below, but it should be noted that the depicted lines of communication can include inter-process communication (e.g., where two or more computer-implemented processes and/or databases reside within the same execution environment) and network-based communication (e.g., where two or more of the computer-implemented processes and/or data stores reside in different execution environments coupled to each other by a computer network). In some examples, the computer-implemented components and databases can be implemented in hardware, software, or a combination of hardware and software.

The graph database 112 is any database or datastore that uses graph structures for semantic queries with nodes (vertices), edges, and properties to represent and store data. The graph structure relates the data items in the store to various nodes and edges, the edges representing the relationships between the nodes. These relationships allow data in the store to be linked together directly and efficiently retrieved. Queries to graph databases are very fast compared to, for example, conventional relational databases (RDB, SQL, etc.) because the relationships are perpetually stored. As described in further detail below, the structure of a graph database can be represented by a schema, which defines and provides a visualization of the database structure in a given state. When the data stored in the graph database is modified, the nodes, the edges, and/or the properties may change. An example of a graph database that can be implemented with the disclosed techniques includes but is not limited to TigerGraph available from TigerGraph of Redwood City, Calif.

The analytics platform 102, the end user client device(s) 104, and the administrator client device(s) 106 are configured to execute, and provide a mechanism for executing, computer-implemented processes that interoperate to manage and deliver applications, data, and desktops in a consistent and secure manner, regardless of the device or location. For example, the end user client device(s) 104 can be configured to interoperate with one or more resources 114 (e.g., servers and/or cloud-based services) via a network 116 using one or more products 118 or applications. In some examples, the products 118 can be used to access functionality provided by multiple enterprise applications—including "software as a service" (SaaS) applications, web applications, desktop applications, and/or proprietary applications—through an interface on the end user client device(s) 104. Other examples of supported products 118 include, for example, Citrix Virtual Apps and Desktop, Citrix Gateway, Citrix Content Collaboration, and Citrix Endpoint Management, each commercially available from Citrix Systems of Fort Lauderdale, Fla., or other products such as Microsoft Graph, commercially available from Microsoft Corp. of Redmond, Wash. Administrators can provide consent to enable data transmission and processing for each of the products 118 for risk analysis, so that end user's interaction with products is sent to the analytics platform 102. The products 118 can be executed by or otherwise interact with the end user client device(s) 104, the resources 114, or a combination of these.

Regardless of how the products 118 are employed, at least some interactions between, and activities involving, the end user client device(s) 104 and the resources 114 via the products 118 are referred to as events 120. An example of an event 120 is when the end user client device 104 sends and/or receives data to or from the resources 114 as part of some activity, such as logging in, exchanging security credentials, requesting access to data, or otherwise accessing or attempting to access services and/or data residing on the resources 114. In some cases, an event 120 can be associated with a user or other entity in the system, including but not limited to physical devices or resources. For example, an entity can be a user, a shared resource, a data store, a network resource, a risk indicator, or any other object that can be stored in the graph database 112. An entity is, in some examples, represented by a vertex in a graph database schema, such as described below. For example, a user is an entity that is represented by a vertex in a graph database schema. Data associated with the entity can be stored, structurally, in relation to the vertex, such as a property of the vertex or as a property of a relation with the vertex, the relation being represented by an edge connected to the vertex. An entity can be dynamically added to, modified in, and/or removed from the graph database schema based on one or more events occurring in association with the entity. For example, a user login event can cause a vertex representing the user to be added to the graph database schema if it does not already exist, or to modify a property of an existing vertex, such as to store the date and time when the user logged in. Other examples of events will be apparent in light of this disclosure.

The analytics platform 102 is configured to retrieve and process, and provide a mechanism for retrieving and processing, the events 120 to determine whether a risk is associated with the corresponding end user client device 104 or other entity in the system 100. For example, determining risk involves an assessment that the security of the end user client device 104, any component interacting with the end user client device 104, or any data accessible via the end user client device 104, is potentially compromised or at risk of being compromised, as defined by a security policy, a risk assessment model, or a rule set. For example, an excessive number of attempts to login to a user account within a certain period of time can be defined as a risk to that user account. Risk can also refer to any other condition to be monitored and analyzed, even if that condition does not pose a threat. For example, risk can refer to an excessive use of network bandwidth, even if such use does not pose a security threat but is rather simply a condition to be monitored for operational purposes. Other examples will be evident in light of this disclosure. The analytics platform 102 continuously assesses the events 120 and applies actions to protect against security threats. The aggregation and correlation of data across networks, virtualized applications and desktops, and content collaboration tools enables the generation of valuable insights and more focused actions to address security threats. Also, machine learning supports highly predictive approaches to identifying malicious behavior.

To this end, the analytics platform 102 is further configured to generate, and provide a mechanism for generating, one or more risk indicators 122 and/or one or more risk scores 124 based on the risk. The risk indicators 122 and the risk scores 124 are stored in the graph database 112 along with the corresponding entity or entities. The analytics platform 102 is further configured to generate, and provide a mechanism for generating, one or more alerts 126 based on the risk indicators 122 and/or risk scores 124. An alert 126 represents a recognition that a risk is detected but it does not necessarily meet the criteria for taking an action 130 to mitigate or otherwise respond to the risk. Rather, the analytics platform 102 evaluates the alerts 126 against one or more policies 128, which define the condition(s) under which the action 130 is to be taken in response to the alert 126.

Figure 2:
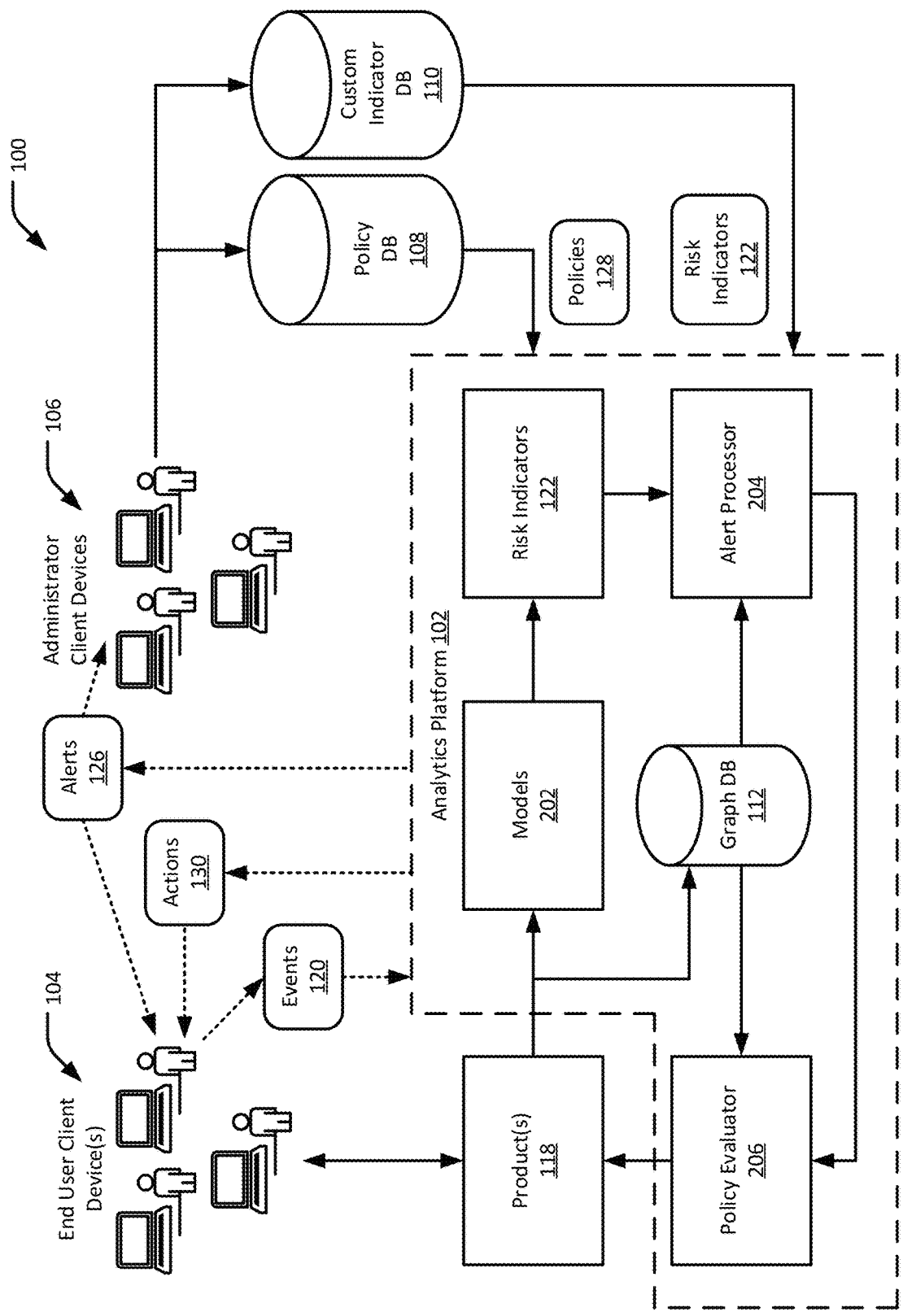
FIG. 2 is another block diagram of the system of FIG. 1 in further detail, in accordance with an example of the present disclosure.

FIG. 2 is another block diagram of the system 100 in further detail, in accordance with an example of the present disclosure. As noted above, the analytics platform 102 is in communication with the policy database 108, the custom indicator database 110, and the graph database 112. The policy database 108 stores data relating to one or more policies 128, which as noted above are used to evaluate the alerts 126 and to determine whether to take the action 130. The custom indicator database 110 stores data, which is configurable (customizable) by the administrator client device(s) 106, relating to one or more risk indicators 122 associated with the end user client device(s) 104 and other entities in the system 100. The analytics platform 102 further includes one or more models 202, an alert processor 204, and a policy evaluator 206.

In more detail, the events 120 are processed by the analytics platform 102 and ingested to the graph database 112. An example of the structure of the graph database 112 is described in further detail with respect to FIG. 4. In some examples, the events 120 are analyzed in parallel by the models 202, including, for example, machine learning (ML) models, statistical models, and/or user-defined models. The models 202 are used to determine if there is any risk or threat associated with the corresponding events 120 and to raise the risk indicator 122 corresponding to the end user client device(s) 104 associated with the events 120. The models 202 can, in some examples, be used to determine a risk score 124 of the end user client device(s) 104 based on the risk. Additionally, the custom indicator database 110 can be configured by the administrator client device(s) 106 to store one or more pre-defined risk indicators 122. The analytics platform 102 is configured to update, and provide a mechanism for updating, the risk indicator 122 in the graph database 112 with the details of the corresponding event 120 and relationships associated with the event 120. For example, a user risk indicator is related to a user and a device risk indicator is related to device. In another example, a risk score is a value between zero and 100 that is assigned to the end user client device(s) 104 or other entities in the system 100. A higher risk score represents a greater degree of risk, where zero represents no risk and 100 represents maximum risk. It will be appreciated that other risk score value scales can be used.

In turn, the alert processor 204 evaluates the risk indicators 122 and/or the risk scores 124 to generate the alerts 126. In some examples, the risk score 124 can be used to represent a combination of multiple alerts 126. These alert(s) 126 can be transmitted to the end user client device(s) 104 and/or to the administrator client devices 106 for further processing. The risk indicators 122 are also used by the alert processor 204 to provide details to the policy evaluator 206 for evaluating the alerts 126 against one or more of the policies 128. The policies 128 define a set of conditions against which information associated with the alerts 126 is evaluated to determine whether one or more actions 130 are to be taken with respect to any of the alerts 126. For example, if the alert 126 indicates that a user has attempted an excessive number of unsuccessful logins, as defined by the policy 128, then an action 130 can be taken to lock the user's account from further access. In another example, if the alert 126 indicates that a user has attempted to access the resources 114 from a different Internet Protocol (IP) address than previously known to the analytics platform 102, as defined by the policy 128, then an action 130 an be taken to lock the user's account from further access from that IP address. The policies 128 can be created by the administrator client devices 106 and can have a single condition or multiple conditions. These conditions can be any of the default defined risk indicators, administrator-created custom indicators, and/or risk score-based conditions. The policies definition is stored in the policy database 108. These processes, including risk determination, policy evaluation, and triggering of an action, can happen in real time or in near-real time. This helps in preventing threats proactively and mitigating risks in the user's environment.

The analytics platform 102 is configured to cause, and provide a mechanism for causing, the end user client device(s) 104 to perform the action(s) 130, such as locking user accounts and restricting access to processing resources, memory, networking ports, and other functions of the device(s) 104, depending on how the policies 128 are configured. Other examples of possible actions will be evident in light of this disclosure.

Policy-Based Analytics Methodology

Figure 3:
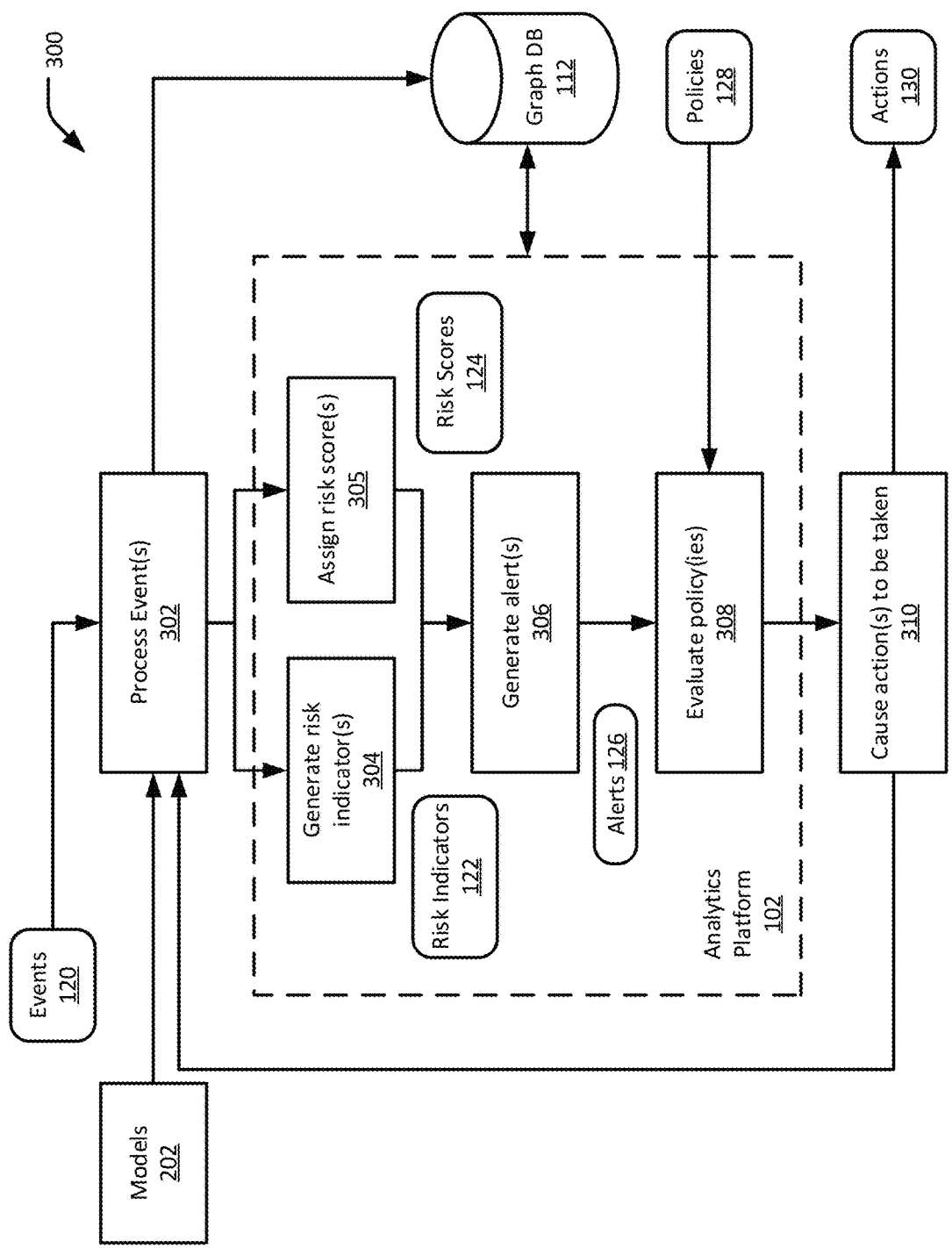
FIG. 3 is a flow diagram of an example policy-based analytics process, in accordance with an example of the present disclosure.

FIG. 3 is a flow diagram of an example analytics process 300, in accordance with an example of the present disclosure. The analytics process 300 can, for example, be implemented by the analytics platform 102 of FIGS. 1 and 2. A user can onboard, or register, one or more products 118, such as a virtual application or desktop, a collaboration application or desktop, or other application, into the analytics platform 102. After successful onboarding, data from these products 118 flow into the analytical service as the events 120. The events 120 sent from the products 118 can, for example, include login to the device 104, access through the network 116, users launching apps, users creating or sharing files, and other such examples. The events 120 are sent to the analytics platform 102 in real time or in near-real time as the corresponding event 120 occurs.

In some examples, data from all the onboarded products are received by the analytics platform 102 and preprocessed before further processing. For example, the data can be enriched and cleaned by normalizing the names and formats of various entities, relations and events represented by the incoming data. For example, if the data represents an IP address of a device, the data can be enriched by converting the IP address to a city/state/location format. In another example, if the data represents a user ID of a user, the data can be enriched by converting the user ID to a username. The enriched data can be stored in the graph database 112.

The events 120 are then processed 302 by the models 202 and the resulting data, including the risk, are ingested to the graph database 112. An example of the structure of the graph database 112 is described in further detail with respect to FIG. 4. In some examples, the events 120 are analyzed in parallel by the models 202, including ML models, statistical models, and/or user-defined models. The models 202 are used to determine if there is any risk or threat associated with the corresponding events 120. In some examples, the analytics platform 102 is configured to generate 304, and provide a mechanism for generating, the risk indicator(s) 122 associated with the risk. The models 202 can, in some examples, be used to assign 305 the risk score(s) 124 of the entity based on the risk. The analytics platform 102 is configured to update, and provide a mechanism for updating, the risk indicator(s) 122 and/or the risk score(s) 124 in the graph database 112 with the details of the corresponding event(s) 120 and relationships associated with the event 120. For example, a user risk indicator is related to a user, a device risk indicator is related to device, etc. In some examples, at least one of the models 202 (e.g., a risk scoring model) is used to determine a risk score 124, as discussed above. The models 202 can be executed periodically, for example, every minute, or every 15 minutes, or the models 202 can be executed in real time with the events 120.

The analytics platform 102 is configured to generate 306, and provide a mechanism for generating, one or more alerts 126 based on the risk indicators 122 and/or the risk scores 124. Any change in the risk indicators 122 and/or the risk scores 124 triggers an alert 126. The alert(s) 126, in turn, trigger the policy evaluator 206 to query of the graph database 112 to retrieve one or more of the policies 128. All the policies 128 configured by the administrator are retrieved from the policy database 108 and validated against information associated with the alerts received from the alert processor 204. The information for evaluating 308 one or more of the policies 128 is retrieved from the graph database 112. In some cases, at least some of the information can be included in the alerts 126. The policies 128 define a set of conditions against which the information is evaluated 308 to determine whether one or more actions 130 are to be taken 310 with respect to any of the alerts 126. For example, if the alert 126 indicates that a user has attempted an excessive number of unsuccessful logins, as defined by the policy 128, then an action 130 can be taken 310 to lock the user's account from further access. In another example, if the alert 126 indicates that a user has attempted to access the resources 114 from a different Internet Protocol (IP) address than previously known to the analytics platform 102, as defined by the policy 128, then an action 130 can be taken 310 to lock the user's account from further access from that IP address. In some examples, the action 130 can be a recommended action; that is, the action 130 is suggested to the user but not executed unless the user triggers the action. This provides flexibility for certain actions that can be performed at the user's discretion rather than automatically. In yet other examples, the action 130 can be a recommended action that is performed automatically if the user does not respond (to either perform the action or cancel the action) within a period of time, such as 10 seconds, 30 seconds, etc.

Returning to FIG. 2, all the policies 128 configured by the administrator are retrieved from the policy database 108 and validated against the alerts 126 received from the alert processor 204. If there are any policies 128 with a condition satisfying the incoming alert 126, then all such policies 128 are evaluated against the graph database 112 by querying if all the conditions of the policies 128 are matched for all the entities in the system 100. For example, if any user in the system 100 is detected with an "excessive authorization failures" risk, then log off the user from the system 100. If there are any such entities that satisfy the conditions of the policy 128, then the data is retrieved from graph database 112 for those entities such that the actions 130 can be performed. The policy evaluator 206 constructs the action payloads and post them to the product(s) 118 to perform the configured action 130 and any global configured action. For example, to perform logoff user, all the networks that the user has accessed over a period of time are retrieved from graph database 112. All the actions 130 that are sent from the policy evaluator 206 are identified by the individual product clients 104 and are applied on the end users so that the risk/threats are prevented on the end user client devices 104 or on other portions (or all) of the system 100. These processes, including risk determination, policy evaluation, and triggering of an action, can happen in real time or near-real time. This helps in preventing threats proactively and mitigating risks in the user's environment.

Sample Graph Database Schema

Figure 4:
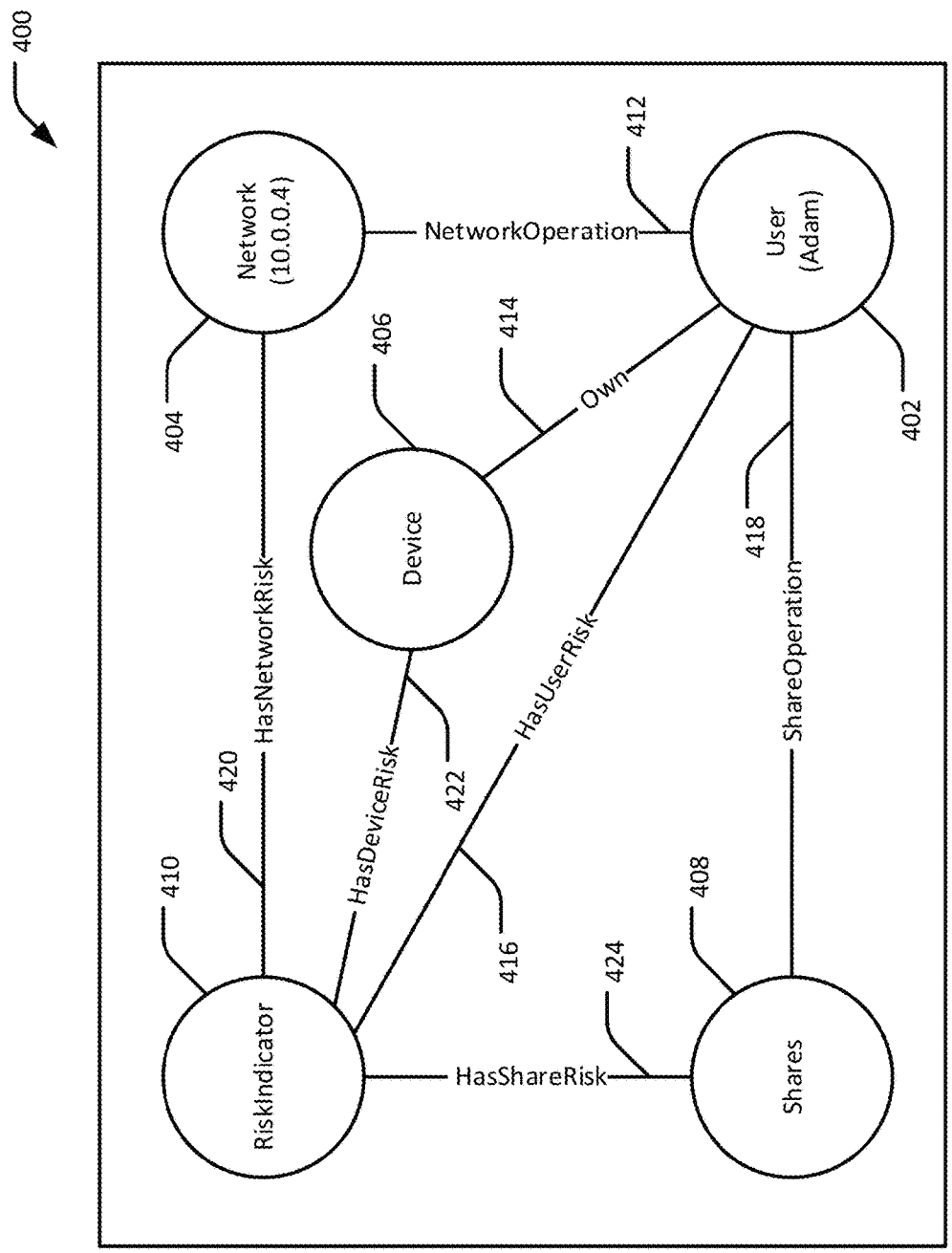
FIG. 4 is a diagram of an example graph database schema, in accordance with an example of the present disclosure.

FIG. 4 is a diagram of an example graph database schema 400, in accordance with an example of the present disclosure. The schema 400 is a representation of the structure of a graph database, such as the graph database 112 of FIGS. 1-3. It will be understood that the schema 400 described here is merely one possible example and that, in practice, the schema will reflect data that is associated with the computing environment (e.g., the system 100 of FIG. 1) at any given time and is subject to change dynamically as entities enter the environment and as events occur over time. Thus, the schema 400 is not a static representation of the graph database but rather an instantaneous representation of the graph database at a given point in time. For example, the graph database can represent the current state of one or more users in the system 100. In some examples, the schema 400 is updated in real time or in near-real time as entities are added to the environment or as events occur in the environment.

In this example, the schema 400 includes the following entities: User 402, Network 404, Device 406, Shares 408, and RiskIndicator 410. Each of these entities is represented in the schema 400 as a vertex in the graph database. The schema 400 further includes the following relations between entities: NetworkOpertation 412, Own 414, HasUserRisk 416, ShareOperation 418, HasNetworkRisk 420, HasDeviceRisk 422, and HasShareRisk 424. Each of these relations is represented in the schema 400 as an edge between corresponding vertices in the graph database. Each of the vertices and edges in the schema 400 can be associated with data relating to the entities and relations, as will be described by example below.

In an example, consider a user Adam whose account is being attacked. The user Adam is represented by the User 402 vertex in the schema 400, and Adam's computing device (e.g., desktop, laptop, tablet, etc.) is represented by the Device 406 vertex. The relation Own 414 represents the relationship between the User 402 Adam and his Device 406. A hacker attempts to login to Adam's account multiple times from a network with IP 10.0.0.4 but fails to login. All login attempts made by Adam are events 120, which are sent as Login Events by the product 118 to the analytics platform 102. The events 120 are loaded to graph database 112 by creating User vertex "Adam" 402 and Network vertex "10.0.0.4". The relation NetworkOperation 412 between the two vertices User 402 and Network 404 is created, with the access time set to the current time.

The events 120 are then sent to the models 202. In some examples, the events 120 are enriched before being sent to the models 202, but it will be understood that data enrichment is not always necessary. The analytics platform 102 is configured to predict, and provide a mechanism for predicting, any risk using the models 202. In this example, the models 202 predict an excessive authorization failures risk, which is associated with the user Adam. The risk is raised as an alert 126, which is sent to the alert processor 204. The risk is updated in the graph database 112 by creating the RiskIndicator 410 vertex for excessive authorization failures and a relation HasUserRisk 416 between the User 402 and RiskIndicator 410 vertices, with the current time stamp of occurrence and any other related information. The alert 126 is then forwarded to policy evaluator 206 for evaluation against one or more of the policies 128.

The policy evaluator extracts all the policies 128 that are configured by the administrator and evaluates all policies that are defined for the User 402 vertex. If the policy's condition(s) match the conditions for the User 402 (Adam), instructions to log off the user are retrieved from the graph database 112 and are sent as an action 130 to be performed by the system 100 or any component of the system (such as the end user client device 104). The system 100 (or component thereof) performs the log off user action on Adam, thus protecting his account from access by the hacker. In some examples, details about the action 130 are sent to Adam via email to notify him of the action 130. Other examples will be apparent in light of this disclosure.

Sample Policy-Based Analytics Methodology

Figure 5:
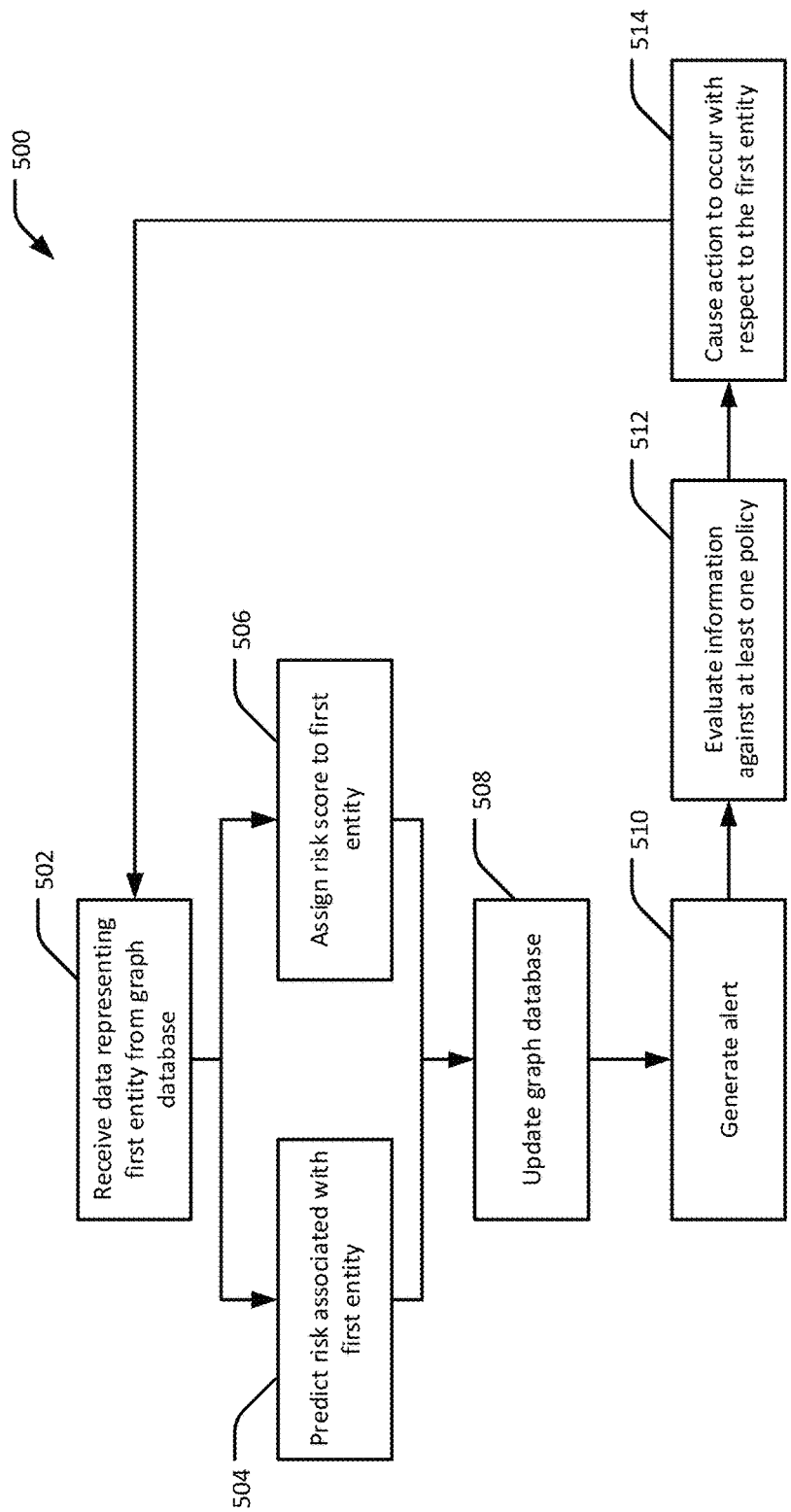
FIG. 5 is a flow diagram of another example policy-based analytics process, in accordance with an example of the present disclosure.

FIG. 5 is a flow diagram of an example process 500 for performing policy-based analytics, in accordance with an example of the present disclosure. The process 500 can be implemented, at least in part, by the analytics platform 102 of FIG. 1. As noted above, the process 500 can i) predict risk associated with an entity and/or assign a risk score to the entity based at least in part on events associated with the entity, ii) update a graph database to include the risk and/or the risk score, and/or iii) generate one or more alerts and actions based at least in part on the risk and/or the risk score.

In more detail, the process 500 includes retrieving 502, from a graph database, first data representing: a first entity in a computing environment; a second entity in the computing environment; and an event associated with the first entity and the second entity. The first entity and the second entity are stored in the graph database as properties of a first vertex and a second vertex, respectively, such as shown and described with respect to FIG. 4. For example, the first entity can be a user and the second entity can be a network, device, share, or risk indicator stored in the graph database. The event is stored in the graph database as a property of the first vertex or of an edge between the first vertex and the second vertex, such as shown and described with respect to FIG. 4. In some cases, the process 500 further includes predicting 504, according to a risk indicator model, a risk associated with the first entity based at least in part on the event. For example, one or more of the models 202 can be used to predict the risk for the first entity (represented by a vertex in the graph database) based on the event. The risk can be stored as a property of an edge between a risk indicator vertex (such as described below) and the first vertex. In some cases, the process further includes assigning 506, according to an entity risk scoring model, a risk score to the first entity based at least in part on the event and the risk.

In either (or both) cases where the risk is predicted 504 or the risk score is assigned 506, the process 500 further includes updating 508 the graph database to include second data representing the risk and a risk indicator, where the risk indicator is stored in the graph database as a property of a third vertex, and where the risk is stored in the graph database as a property of an edge between the first vertex and the third vertex. In some examples, the process 500 further includes updating 508 the graph database to include third data representing the risk score, where the risk score is stored in the graph database as an additional property of the edge between the first vertex and the third vertex, or as a property of the first vertex and/or the third vertex. It will be understood that in some implementations, the risk is represented by the edge while the risk indicator and/or the risk score is represented by the vertex that is connected to the edge.

In some examples, the process 500 includes generating 510 an alert based at least in part on the risk. For example, the alert can be triggered by the risk indicator and/or by the risk score. In some examples, the process 500 further includes retrieving, from the graph database, information associated with the additional alert and evaluating 512 the information against at least one policy associated with the first entity to determine whether the alert satisfies at least one condition in the at least one policy. The policy conditions can include any data or values against which the alert is to be compared, such as user information, device information, network information, risk indicator information, shared resource information, and/or any information associated with the event used to predict the risk.

In some examples, the process 500 includes causing 514, in response to determining that the alert satisfies the at least one condition, an action to occur with respect to the first entity. As noted above, the action can be performed by any component of the computing environment (e.g., the system 100), including the end user computing device 104. Further, the action can be performed automatically or at the user's discretion when the action is provided to the user as a recommendation.

Example Computing Platform

Figure 6:
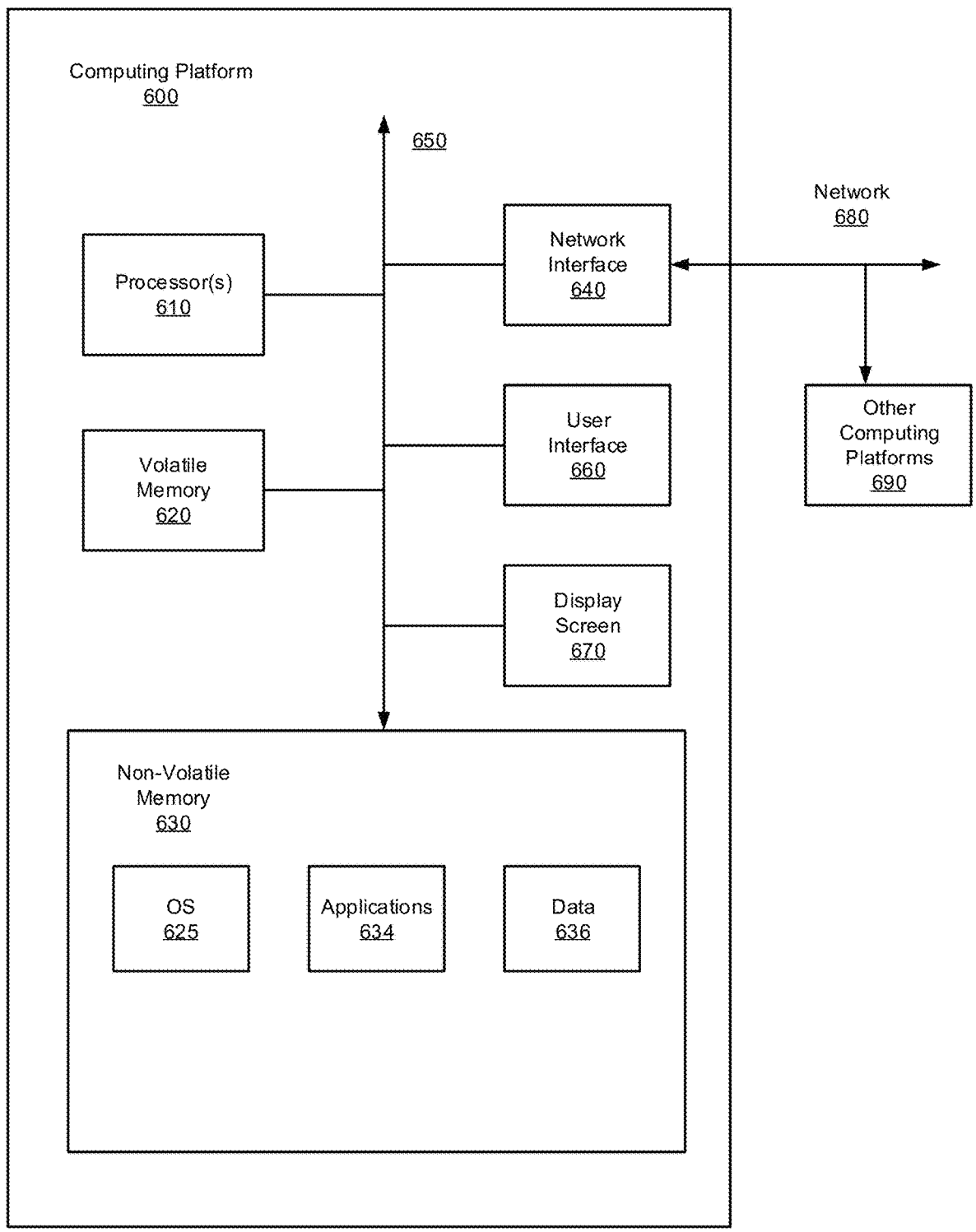
FIG. 6 is a block diagram of a computing platform configured to perform policy-based analytics, in accordance with an example of the present disclosure.

FIG. 6 is a block diagram of a computing platform 600 configured to perform policy-based analytics, in accordance with an example of the present disclosure. In some cases, the platform 600 may be a workstation, a laptop computer, a tablet, a mobile device, or any suitable computing or communication device.

The computing platform or device 600 includes one or more processors 610, volatile memory 620 (e.g., random access memory (RAM)), non-volatile memory 630, one or more network or communication interfaces 640, a user interface (UI) 660, a display screen 670, and a communications bus 650. The computing platform 600 may also be referred to as a computer or a computer system.

The non-volatile (non-transitory) memory 630 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 660 can include one or more input/output (I/O) devices (e.g., a mouse, a keyboard, a microphone, one or more speakers, one or more biometric scanners, one or more environmental sensors, and one or more accelerometers, etc.).

The display screen 670 can provide a graphical user interface (GUI) and in some cases, may be a touchscreen or any other suitable display device.

The non-volatile memory 630 stores an operating system ("OS") 625, one or more applications 634, and data 636 such that, for example, computer instructions of the operating system 625 and the applications 634, are executed by processor(s) 610 out of the volatile memory 620. In some examples, the volatile memory 620 can include one or more types of RAM and/or a cache memory that can offer a faster response time than a main memory. Data can be entered through the user interface 660. Various elements of the computer platform 600 can communicate via the communications bus 650.

The illustrated computing platform 600 is shown merely as an example computing device and can be implemented by any computing or processing environment with any type of machine or set of machines that can have suitable hardware and/or software capable of operating as described herein.

The processor(s) 610 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 610 can be analog, digital or mixed. In some examples, the processor 610 can be one or more physical processors, which may be remotely located or local. A processor including multiple processor cores and/or multiple processors can provide functionality for parallel, simultaneous execution of instructions or for parallel, simultaneous execution of one instruction on more than one piece of data.

The network interfaces 640 can include one or more interfaces to enable the computing platform 600 to access a computer network 680 such as a Local Area Network (LAN), a Wide Area Network (WAN), a Personal Area Network (PAN), or the Internet through a variety of wired and/or wireless connections, including cellular connections. In some examples, the network 680 may allow for communication with other computing platforms 690, to enable distributed computing. In some examples, the network 680 may allow for communication with the one or more of the analytics platform 102, the end user client device(s) 104, the administrator client device(s) 106, the policy database 108, the custom indicator database 110, and/or the graph database 112 of FIG. 1.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A method comprising:
retrieving, from a graph database, first data representing a first entity in a computing environment, a second entity in the computing environment, and an event representing data exchanged between the first entity and the second entity, wherein the first entity and the second entity are stored in the graph database as properties of a first vertex and a second vertex, respectively, and wherein the event is stored in the graph database as a property of an edge between the first vertex and the second vertex;

predicting, according to a risk indicator model and responsive to an occurrence of the event, a risk associated with the first entity based at least in part on the event;

adding or modifying, responsive to the predicting of the risk, a third vertex to the graph database; and updating the graph database to include second data representing the risk and a risk indicator, wherein the risk indicator is stored in the graph database as a property of the third vertex, and wherein the risk is stored in the graph database as a property of an edge between the first vertex and the third vertex.

2. The method of claim 1, further comprising:
generating an alert based at least in part on the risk;
retrieving, from the graph database, information associated with the alert;
evaluating the information against at least one policy associated with the first entity to determine whether the information satisfies at least one condition in the at least one policy; and
causing, in response to determining that the information satisfies the at least one condition, an action to occur with respect to the first entity.

3. The method of claim 2, further comprising assigning, according to an entity risk scoring model, a risk score to the first entity based at least in part on the event and the risk, wherein the at least one condition is based at least in part on the risk score.

4. The method of claim 3, further comprising updating the graph database to include third data representing the risk score, wherein the risk score is stored in the graph database as an additional property of the edge between the first vertex and the third vertex.

5. The method of claim 1, further comprising:
preprocessing at least one of the first data and/or the second data to produce enriched data, wherein the risk is predicted based at least in part on the enriched data; and
updating the graph database to include the enriched data, wherein the enriched data is stored in the graph database as one or more additional properties of the first vertex and/or the edge between the first vertex and the third vertex.

6. The method of claim 1, further comprising:
receiving an additional event associated with the first entity and the second entity;
predicting, according to the risk indicator model, an additional risk associated with the first entity based at least in part on the additional event; and
updating the graph database to include third data representing the additional risk, wherein the additional risk is stored in the graph database as an additional property of the edge between the first vertex and the third vertex.

7. The method of claim 6, further comprising:
generating an additional alert based at least in part on the additional risk;
retrieving, from the graph database, information associated with the additional alert;
evaluating the information against at least one policy associated with the first entity to determine whether the information satisfies at least one condition in the at least one policy; and causing, in response to determining that the information satisfies the at least one condition, an additional action to occur with respect to the first entity.

8. A non-transitory machine-readable medium having processor executable instructions encoded thereon that when executed by at least one processor cause a process to be carried out, the process comprising:
retrieving, from a graph database, first data representing a first entity in a computing environment, a second entity in the computing environment, and an event representing data exchanged between the first entity and the second entity, wherein the first entity and the second entity are stored in the graph database as properties of a first vertex and a second vertex, respectively, and wherein the event is stored in the graph database as a property of an edge between the first vertex and the second vertex;
assigning, according to an entity risk scoring model and responsive to an occurrence of the event, a risk score to the first entity based at least in part on the event;
adding or modifying, responsive to the assigning of the risk score, a third vertex to the graph database; and
updating the graph database to include second data representing the risk score and a risk indicator, wherein the risk indicator is stored in the graph database as a property of the third vertex, and wherein the risk score is stored in the graph database as a property of an edge between the first vertex and the third vertex.

9. The non-transitory machine-readable medium of claim 8, wherein the process further includes:
generating an alert based at least in part on the risk score;
retrieving, from the graph database, information associated with the alert;
evaluating the information against at least one policy associated with the first entity to determine whether the information satisfies at least one condition in the at least one policy; and
causing, in response to determining that the information satisfies the at least one condition, an action to occur with respect to the first entity.

10. The non-transitory machine-readable medium of claim 9, wherein the process further includes predicting, according to a risk indicator model, a risk associated with the first entity based at least in part on the event, wherein the at least one condition is based at least in part on the risk.

11. The non-transitory machine-readable medium of claim 10, wherein the process further includes updating the graph database to include third data representing the risk, wherein the risk is stored in the graph database as an additional property of the edge between the first vertex and the third vertex.

12. The non-transitory machine-readable medium of claim 8, wherein the process further includes:
preprocessing at least one of the first data and/or the second data to produce enriched data, wherein the risk score is assigned based at least in part on the enriched data; and
updating the graph database to include the enriched data, wherein the enriched data is stored in the graph database as one or more additional properties of the first vertex and/or the edge between the first vertex and the third vertex.

13. The non-transitory machine-readable medium of claim 8, wherein the process further includes:
receiving an additional event associated with the first entity and the second entity;

updating, according to the entity risk scoring model, the risk score based at least in part on the additional event; and updating the graph database to include third data representing the updated risk score.

14. The non-transitory machine-readable medium of claim 13, wherein the process further includes:

generating an additional alert based at least in part on the updated risk score;

retrieving, from the graph database, information associated with the additional alert;

evaluating the information against at least one policy associated with the first entity to determine whether the information satisfies at least one condition in the at least one policy; and causing, in response to determining that the information satisfies the at least one condition, an additional action to occur with respect to the first entity.

15. A system comprising:

a storage; and at least one processor operatively coupled to the storage, the at least one processor configured to execute instructions stored in the storage that when executed cause the at least one processor to carry out a process including retrieving, from a graph database, first data representing a first entity in a computing environment, a second entity in the computing environment, and an event representing data exchanged between the first entity and the second entity;

predicting, according to a risk indicator model and responsive to an occurrence of the event, a risk associated with the first entity based at least in part on the event; and updating, responsive to the predicting of the risk, the graph database to include second data representing the risk and a risk indicator.

16. The system of claim 15, wherein the process includes:

generating an alert based at least in part on the risk;

retrieving, from the graph database, information associated with the additional alert;

evaluating the information against at least one policy associated with the first entity to determine whether the information satisfies at least one condition in the at least one policy; and causing, in response to determining that the information satisfies the at least one condition, an action to occur with respect to the first entity.

17. The system of claim 16, wherein the process includes assigning, according to an entity risk scoring model, a risk score to the first entity based at least in part on the event and the risk, wherein the at least one condition is based at least in part on the risk score.

18. The system of claim 17, wherein the process includes updating the graph database to include third data representing the risk score.

19. The system of claim 15, wherein the process includes:

receiving an additional event associated with the first entity and the second entity;

predicting, according to the risk indicator model, an additional risk associated with the first entity based at least in part on the additional event; and updating the graph database to include third data representing the additional risk.

20. The system of claim 19, wherein the process includes:

generating an additional alert based at least in part on the additional risk;

retrieving, from the graph database, information associated with the additional alert;

evaluating the information against at least one policy associated with the first entity to determine whether the information satisfies at least one condition in the at least one policy; and causing, in response to determining that the information satisfies the at least one condition, an additional action to occur with respect to the first entity.

* * * * *